US008755330B2

(12) United States Patent
Liu

(10) Patent No.: US 8,755,330 B2
(45) Date of Patent: Jun. 17, 2014

(54) METHOD AND SYSTEM FOR REPORTING QUALITY STATISTIC INFORMATION OF CALL LINK

(75) Inventor: Qiang Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 155 days.

(21) Appl. No.: 13/259,080

(22) PCT Filed: Jul. 22, 2010

(86) PCT No.: PCT/CN2010/075384
§ 371 (c)(1),
(2), (4) Date: May 15, 2012

(87) PCT Pub. No.: WO2011/060649
PCT Pub. Date: May 26, 2011

(65) Prior Publication Data
US 2012/0230253 A1     Sep. 13, 2012

(30) Foreign Application Priority Data
Nov. 19, 2009  (CN) .......................... 2009 1 0109761

(51) Int. Cl.
*H04W 4/00*  (2009.01)

(52) U.S. Cl.
USPC .......................... 370/328; 370/331; 370/332

(58) Field of Classification Search
CPC . H04L 65/608; H04L 47/801; H04L 41/5032; H04L 47/805; H04W 28/24; H04W 28/18; H04W 74/00; H04W 76/02; H04W 88/08
See application file for complete search history.

(56) References Cited

U.S. PATENT DOCUMENTS 7,149,228 B1 * 12/2006 Kirla .............................. 370/465

| 7,280,828 B1 | 10/2007 | Shah |
| 2007/0218909 A1 | 9/2007 | Deng et al. |

FOREIGN PATENT DOCUMENTS

| CN | 1655484 A | 8/2005 |
| CN | 1770902 A | 5/2006 |
| CN | 1972490 A | 5/2007 |

(Continued)

OTHER PUBLICATIONS

GSM 08.58, May 1998, Version 5.7.0.*
International Search Report on international application No. PCT/CN2010/075384, mailed on Nov. 4, 2010.

(Continued)

*Primary Examiner* — David Oveissi
(74) *Attorney, Agent, or Firm* — Oppedahl Patent Law Firm LLC

(57) ABSTRACT

The disclosure provides a method and system for reporting quality statistic information of a call link. The method comprises the steps that: a message for transmitting the quality statistic information of the call link is predetermined between a Base Station (BS) and a Base Station Controller (BSC); when detecting that the current call enters into a local switching mode, the BS reports the detected quality statistic information of the call link of the current call to the BSC through the predetermined message; the BSC parses the received predetermined message, and reports quality statistic information of the call link of the current call obtained by parsing. The system comprises a BS and a BSC. The disclosure can transmit, in the local switching mode, the quality statistic message of the call link to the BSC, to enable the BSC to learn the link quality of the user plane in the local switching mode in time, thus a decision can be made in time and continuity of observing the call link quality by the BSC and the staff in two switching modes is guaranteed.

9 Claims, 9 Drawing Sheets

(56) References Cited

FOREIGN PATENT DOCUMENTS

| CN | 101159905 A | 4/2008 |
|----|-------------|--------|
| CN | 101431812 A | 5/2009 |
| JP | 2000341204 A | 12/2000 |
| WO | 2009009394 A1 | 1/2009 |

OTHER PUBLICATIONS

English Translation of the Written Opinion of the International Search Authority in international application No. PCT/CN2010/075384, mailed on Nov. 4, 2010.

* cited by examiner

| 8 | 7 | 6 | 5 | 4 | 3 | 2 | 1 | |
|---|---|---|---|---|---|---|---|---|
| Element identifier ||||||||  Octet1 |
| Length |||||||| Octet2 |
| Link Quality |||| Time Delay |||| Octet3 |
| Link Qos |||||||| Octet4-19 |
| Supplementary Measurement information |||||||| Octet20-21 |

METHOD AND SYSTEM FOR REPORTING QUALITY STATISTIC INFORMATION OF CALL LINK

TECHNICAL FIELD

The disclosure relates to technology of reporting quality statistic information of a call link, and in particular to a method and system for reporting quality statistic information of a call link.

BACKGROUND

At present, many communication systems are provided not only with a conventional switching function, but also with a local switching function, when meeting a certain condition, the communication system can switch between the two modes above.

Conventional switching, as shown in FIG. 1, refers to a mode in which the switch between a calling Base Station (BS) and a called BS needs to be performed through a core network. In this mode, a Base Station Controller (BSC) allocates and activates, through a control plane, a Real Time Transport Protocol (RTP) link required by a user plane to perform communicating; during this period, the quality statistic information of the RTP link is sent to the BSC through a Realtime Transport Control Protocol (RTCP) link which has a different port but the same Internet Protocol (IP) address with the RTP link; that is, in the conventional switching mode, when a person gets through, the control plane voice and the user plane voice both flow through the BSC and the core network. The RTCP link and the RTP link are in a one-to-one correspondence relationship, i.e., one RTCP link corresponds to one RTP link, and the corresponding quality statistic information of the RTP link is transmitted to the BSC. The RTCP link and the RTP link have different ports but the same IP address. The RTCP link will be informed of the quality statistic information of the RTP link at regular time intervals, and then reports the quality statistic information to the BSC. According to the received link quality statistic information, the BSC learns the user plane link situation and processes it in time, and at the same reports the RTP link situation.

At this moment, on the control plane, the BS reports the measurement result message to the BSC periodically, the message mainly includes the quality and the level of the radio link.

FIG. 2 shows a message flowchart illustrating that a call enters into a local switching mode from a conventional switching mode in the prior art, comprising the following steps:

step 201: in the conventional switching mode, the RTP link has been established and the call is underway;

step 202: the BSC decides to enter into the local switching mode;

step 203: the BSC transmits new-channel establishment messages to a BS 1 and a BS 2 respectively to notify the BS to establish a new RTP link;

wherein, the new-channel establishment message sent to the BS 1 contains a local switching identifier, the IP address and the port number of the BS 2; the new-channel establishment message sent to the BS 2 contains a local switching identifier, the IP address and the port number of the BS 1; the local switching identifier is used for indicating that the purpose of establishing a new channel this time is to perform local switching;

step 204: after obtaining from the new-channel establishment messages the information of establishing new RTP links, the BS 1 and the BS 2 perform RTP link establishment and record the switching mode identifier as local switching;

step 205: the BS 1 and the BS 2 report RTP establishment success messages to the BSC;

step 206: after guaranteeing the intercommunication of the RTP links of the BS 1 and the BS 2, the BSC transmits an old-channel (that is, the RTP link originally used) release message to the BS 1 and the BS 2;

step 207: after receiving the old-channel release message, the BS 1 and the BS 2 release channels, and report releasing complete messages to the BSC after completing the release;

step 208: the BS 1 and the BS 2 record the switching complete identifier as 'completed';

step 209: the current call is performed in the local switching mode.

FIG. 3 shows a message flowchart illustrating that a call enters into a conventional switching model from a local switching mode in the prior art, comprising the following steps:

step 301: in the local switching mode, the RTP link has been established and the call is underway;

step 302: the BSC decides to enter into the conventional switching mode;

step 303: the BSC transmits new-channel establishment messages to a BS 1 and a BS 2 respectively to notify the BS to establish a new RTP link;

wherein, the new-channel establishment message sent to the BS 1 contains a conventional switching identifier, the IP address and the port number of the BSC; the new-channel establishment message sent to the BS 2 contains a conventional switching identifier, the IP address and the port number of the BSC; the conventional switching identifier is used for indicating that the purpose of establishing a new channel this time is to perform a conventional switching;

step 304: after obtaining from the new-channel establishment messages the information of establishing new RTP links, the BS 1 and the BS 2 perform RTP link establishment and record the switching mode identifier as a conventional switching;

step 305: the BS 1 and the BS 2 report RTP establishment success messages to the BSC;

step 306: after guaranteeing the intercommunication of the RTP links of the BS 1 and the BS 2, the BSC transmits an old-channel (that is, the RTP link originally used) release message to the BS 1 and the BS 2;

step 307: after receiving the old-channel release message, the BS 1 and the BS 2 release channels, and report Releasing complete messages to the BSC after completing the release;

step 308: the BS 1 and the BS 2 record the switching complete identifier as 'completed';

step 309: the current call is performed in the conventional switching mode.

Local switching, as shown in FIG. 4, refers to a mode in which the call between a calling user and a called user no longer passes through the core network and is directly performed between the calling BS and the called BS when the calling user and the called user satisfy certain conditions. The advantages of this mode are as follows: the occupation of the core network resource is reduced, the transmission delay of the voice is shortened, the utilized bandwidth of the Abis interface and the like is reduced and convenience is brought to the operator and the user. The most important characteristic of the local switching is that: in the local switching mode, the control plane flow keeps unchanged during the call; however, the user plane data is no longer transmitted through the core network and is directly transmitted between the BSs. As shown in FIG. 2, in this mode, the RTP link on which the voice is transported has been re-established between the BSs, the original RTP link between the BS and the BSC has been removed; therefore, the link quality statistic information which is transmitted through the RTCP link is sent to the opposite BS accordingly; on one hand, the opposite BS does not have to and cannot process the received information; on the other hand, the BSC which needs the information cannot receive the information since the link between the BS and the BSC is released. Therefore, it has become an important problem on how to transmit the quality statistic information of the call link to the BSC in the local switching mode such that the BSC and the staff can prevent the out-of-control of the user plane.

SUMMARY

An object of the disclosure is to provide a method and system for reporting quality statistic information of a call link, and to provide a BS and a BSC, for solving the problem existing in the prior art that the quality statistic information of a call link cannot be transmitted to the BSC in the local switching mode. The disclosure is convenient for the BSC to learn the call link quality in time during the local switching so as to provide basis for accurate decision.

The disclosure provides a method for reporting quality statistic information of a call link, wherein a message for transmitting the quality statistic information of the call link is predetermined between a BS and a BSC; when detecting that a current call enters into a local switching mode, the BS reports detected quality statistic information of a call link of the current call to the BSC through the predetermined message; the BSC parses the received predetermined message, and reports quality statistic information of the call link of the current call obtained by parsing.

Preferably, the method may further comprise: the BS encodes the detected quality statistic information of the call link of the current call into the predetermined message.

Preferably, the predetermined message may be an extended measurement result message.

Preferably, an extended information unit of the extended measurement result message may be a link measurement information unit.

Preferably, the link measurement information unit may comprise a link quality field, a time delay field, a link Quality of Service (QoS) field.

The disclosure provides a system for reporting quality statistic information of a call link, the system comprise a BS and a BSC;

wherein the BS is configured to encode detected quality statistic information of a call link into a predetermined message and send the message to the BSC;

the BSC is configured to parse the received predetermined message and report quality statistic information of the call link obtained by parsing.

Preferably, the BS may comprise a link detecting module, a switch module and an encoding module, wherein the link detecting module may be configured to detect the quality statistic information of the call link;

the switch module may be configured to send the quality statistic information of the call link detected by the link detecting module to the encoding module;

the encoding module may be configured to encode the received quality statistic information of the call link into the predetermined message and send the predetermined message to the BSC.

Preferably, the BSC may comprise a decoding module and a reporting module, wherein the decoding module may be configured to parse the received predetermined message and send quality statistic information of the call link obtained by parsing to the reporting module;

the reporting module may be configured to report the received quality statistic information of the call link.

Preferably, the BS may be further configured to send the detected quality statistic information of the call link to the BSC; the switch module may be further configured to send the quality statistic information of the call link detected by the link detecting module to the reporting module through an RTCP link.

The disclosure also provides a BS, which is configured to encode detected quality statistic information of a call link into a predetermined message and send the predetermined message.

The disclosure further provides a BSC, which is configured to parse a received predetermined message and report quality statistic information of a call link obtained by parsing.

In the disclosure, by extending the measurement result information existing in the Global System for Mobile Communications (GSM) 0858 protocol, the quality statistic message of the call link can be reported to the BSC in the local switching mode, to enable the BSC and the staff to learn the link quality situation of the user plane in the local switching mode in time, thus a decision can be made in time, and the continuity of observing the call link quality by the BSC and the staff in two switching modes is guaranteed.

BRIEF DESCRIPTION OF THE DISCLOSURE

Realization of the purpose, the functional features and advantages of the disclosure are further illustrated below in conjunction with embodiments by referring to accompanying drawings.

DETAILED DESCRIPTION OF THE DISCLOSURE

Figure 4:
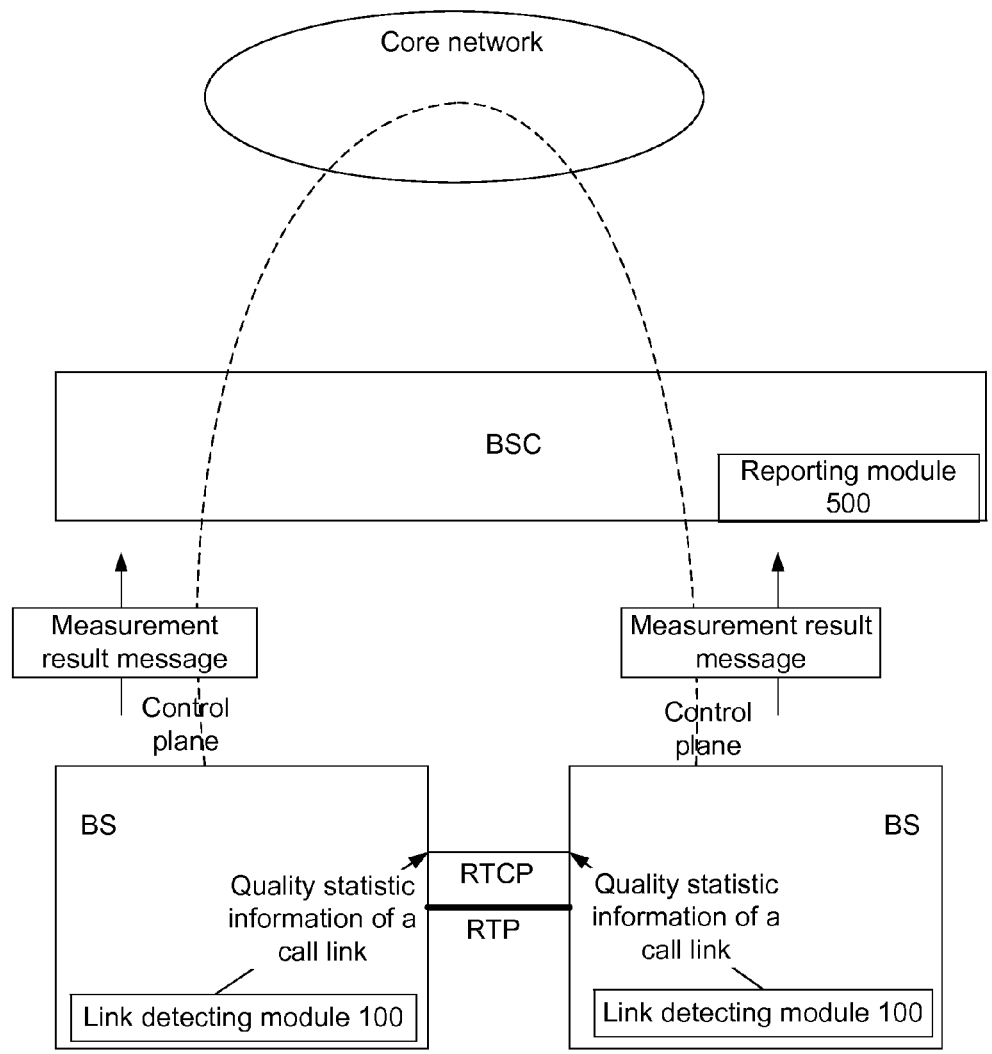
FIG. 4 shows a flowchart illustrating a trend of quality statistic information of a call link in a local switching mode of the prior art.

In the prior art, in the conventional switching mode, the BS transmits the quality statistic information of a call link to the BSC through the RTCP link; however, in the local switching mode, the quality statistic information of a call link cannot be transmitted to the BSC, thus, the BSC cannot learn the link quality continuously. The disclosure is to solve the problem on how to transmit the quality statistic information of a call link to the BSC after the call enters into the local switching mode; it can be seen from FIG. 1 and FIG. 4 that no matter in the conventional switching mode or in the local switching mode, the quality statistic information (quality and level) of an uplink/downlink service link is transmitted to the BSC through the core network which regularly reports a measurement result message (message defined in GSM0858 protocol); therefore, in the disclosure, the quality statistic information of the call link can be transmitted to the BSC by using the measurement result message in the local switching mode; however, all the existing information units of the measurement result message have been used; therefore, it is necessary to extend the measurement result message firstly, and then to predetermine an extended measurement result message used for transmitting the quality statistic information of the call link between the BS and the BSC.

The method according to the disclosure comprises the steps that: a message for transmitting the quality statistic information of a call link is predetermined between a BS and a BSC; when detecting that the current call enters into a local switching mode, the BS reports the detected quality statistic information of the call link of the current call to the BSC through the predetermined message; the BSC parses the received predetermined message, and reports the quality statistic information of the call link of the current call obtained by parsing.

The method further comprises that: the BS encodes the detected quality statistic information of the call link of the current call into the predetermined message; the predetermined message is an extended measurement result message; the extended information unit of the extended measurement result message is a link measurement information unit; the link measurement information unit includes a link quality field, a time delay field, a link QoS field.

The system according to the disclosure is used for implementing the method above, comprising: a BS and a BSC; wherein the BS is configured to encode a detected quality statistic information of a call link into a predetermined message and send the message to the BSC; the BSC is configured to parse the received predetermined message and report the quality statistic information of the call link obtained by parsing.

The BS comprises a link detecting module, a switch module and an encoding module, wherein the link detecting module is configured to detect the quality statistic information of the call link; the switch module is configured to send the quality statistic information of the call link detected by the link detecting module to the encoding module; the encoding module is configured to encode the received quality statistic information of the call link into the predetermined message and send the predetermined message to the BSC.

The BSC comprises a decoding module and a reporting module, wherein the decoding module is configured to parse the received predetermined message and send the quality statistic information of the call link obtained by parsing to the reporting module; the reporting module is configured to report the received quality statistic information of the call link.

The BS is further configured to send the detected quality statistic information of the call link to the BSC; the switch module is further configured to send the quality statistic information of the call link detected by the link detecting module to the reporting module through an RTCP link.

The BS according to the disclosure is configured to encode the detected quality statistic information of the call link into the predetermined message and send the predetermined message.

The BSC according to the disclosure is configured to parse the received predetermined message and report the quality statistic information of the call link obtained by parsing.

The following is the preferred embodiments of the disclosure.

Figure 5:
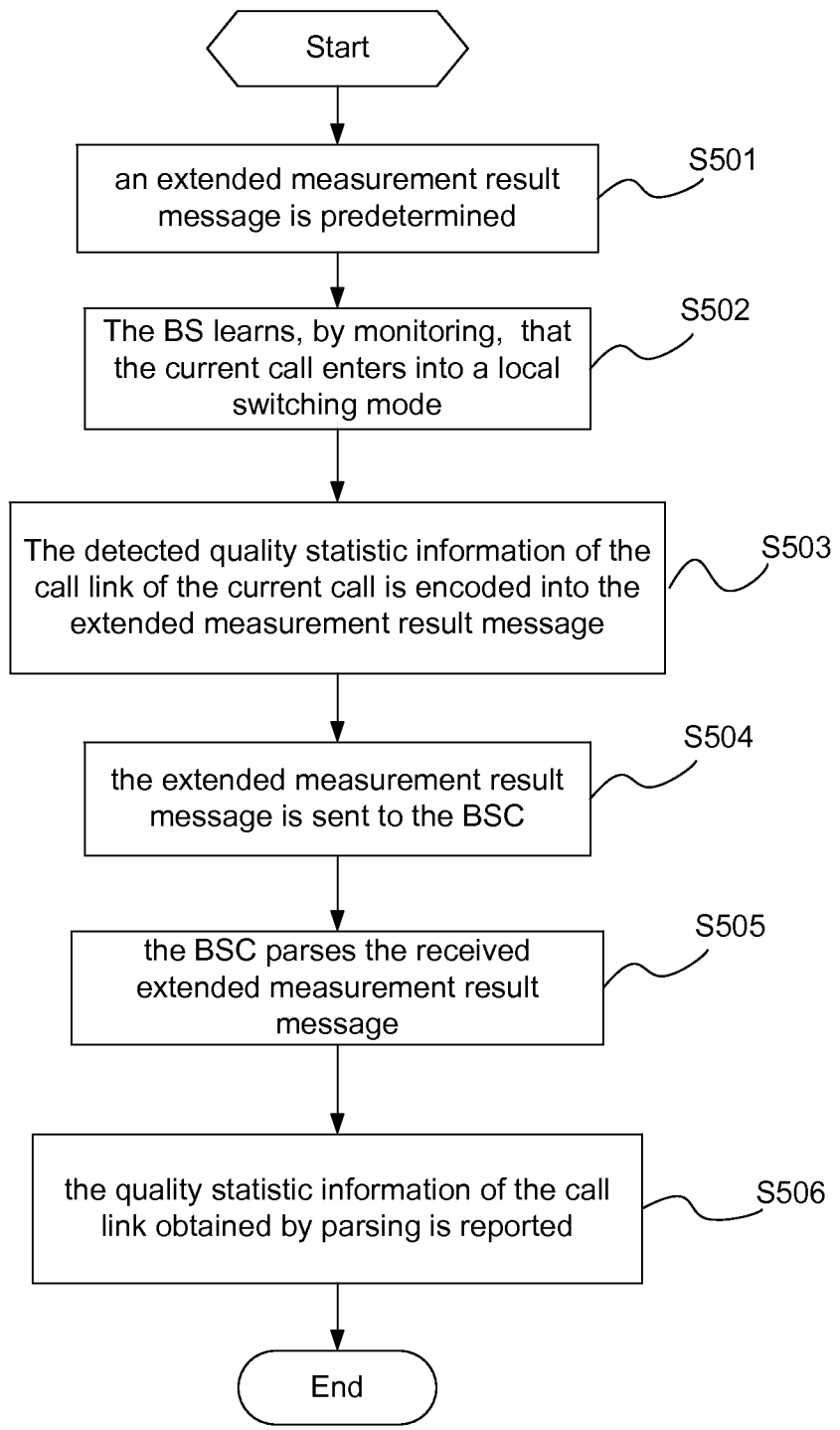
FIG. 5 shows a flowchart illustrating the first embodiment of a method according to the disclosure.

FIG. 5 shows a flowchart illustrating the first embodiment of a method according to the disclosure, the method comprises the following steps:

step 501: an extended measurement result message for transmitting the quality statistic information of a call link is predetermined between the BS and the BSC;

the extended information unit of the extended measurement result message is a link measurement information unit, which is dedicated to bearing the quality statistic information of the call link;

step 502: the BS learns, by monitoring, that the current call enters into a local switching mode;

the condition for the current call entering into the local switching mode is that: the switching mode identifier is the local switching and the switching complete identifier is 'completed', that is to say, when the recorded switching mode identifier is the local switching and the recorded switching complete identifier is 'completed', the BS deems that the current call enters into the local switching mode;

step 503: the detected quality statistic information of the call link of the current call is encoded into the extended measurement result message;

step 504: the extended measurement result message is reported to the BSC;

step 505: the BSC parses the received extended measurement result message;

step 506: the link quality statistic information of the current call obtained by parsing is reported.

Figure 1:
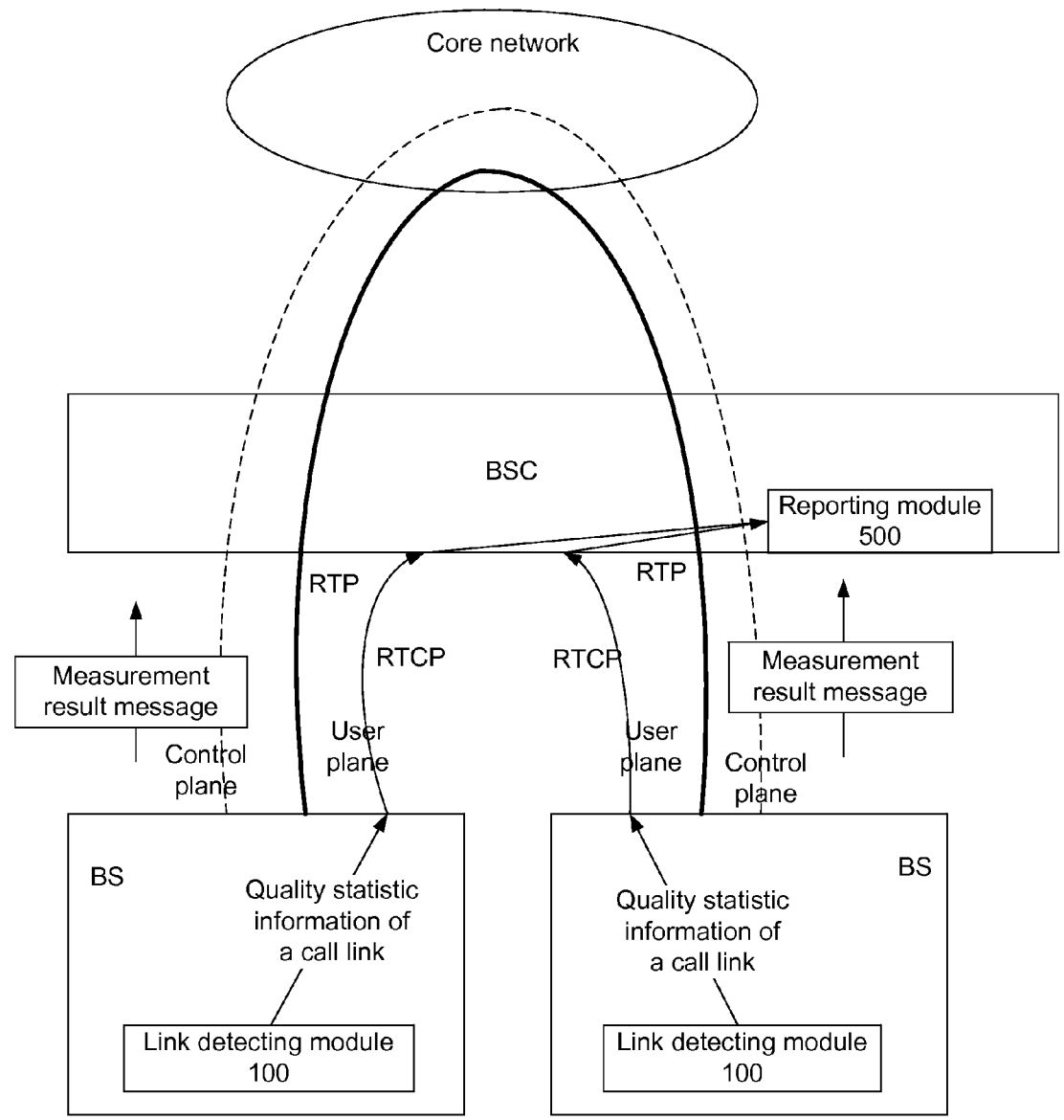
FIG. 1 shows a flowchart illustrating a trend of quality statistic information of a call link in the conventional switching mode of the prior art.
Figure 2:
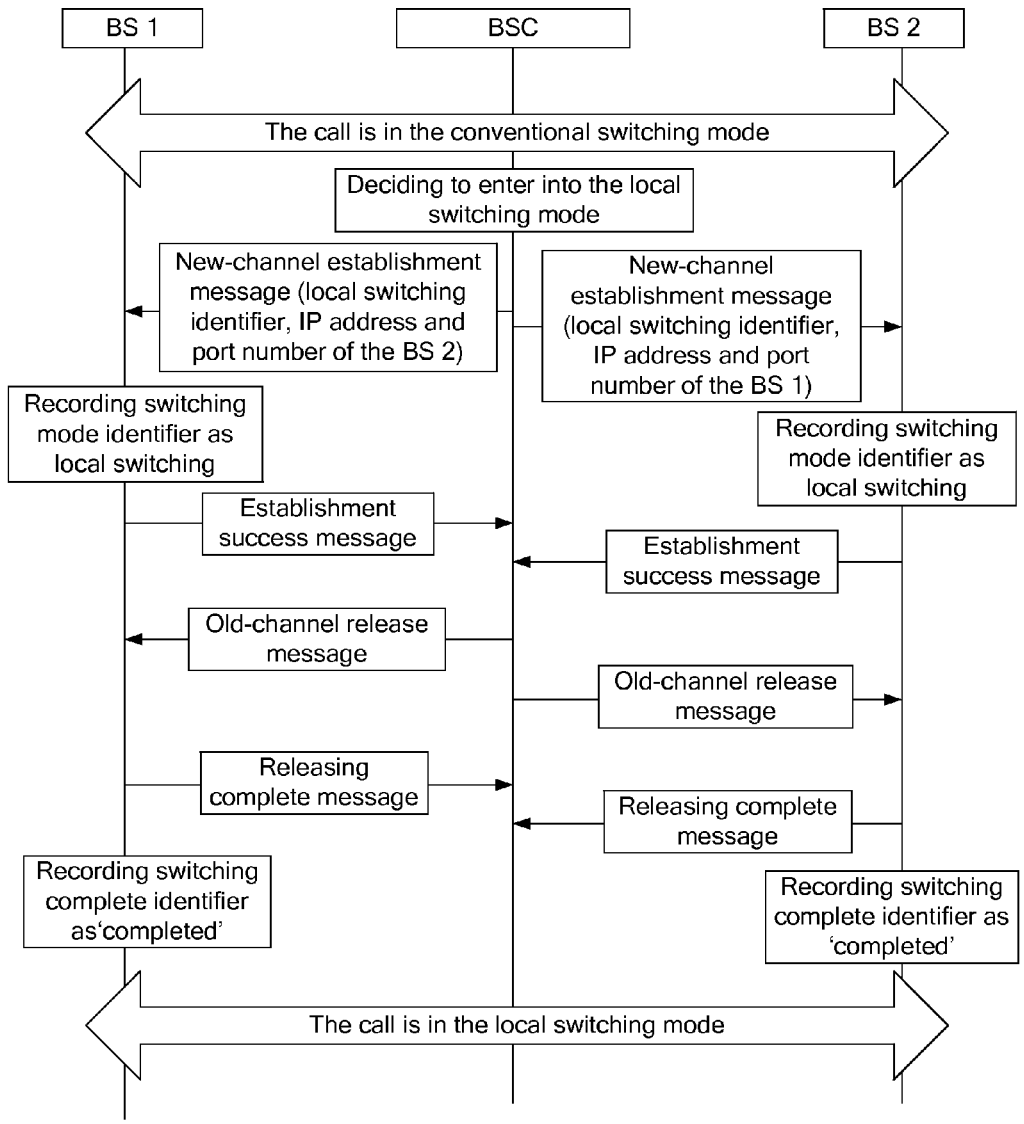
FIG. 2 shows a message flowchart illustrating that a call is switched to a local switching mode from a conventional switching mode in the prior art.
Figure 3:
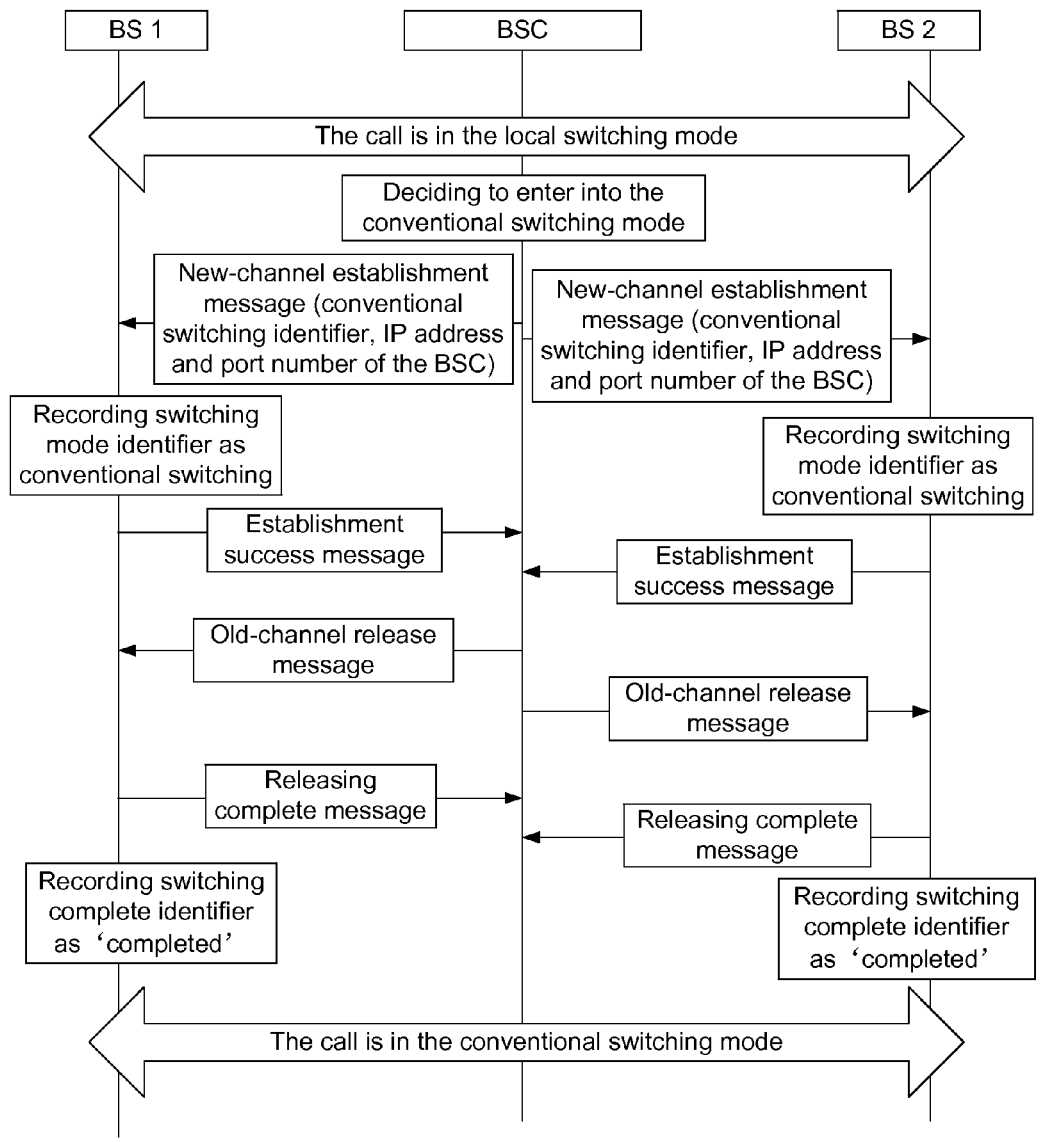
FIG. 3 shows a message flowchart illustrating that a call is switched to a conventional switching mode from a local switching mode in the prior art.

In the local switching mode, if the BS learns, by monitoring, that the current call enters into the conventional switching mode, the BS transmits the detected link quality statistic information of the current call to the BSC through the established RTCP link, as shown in FIG. 1.

Figures 6, 7:
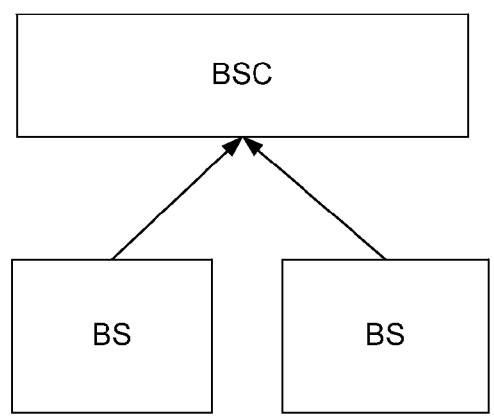
FIG. 6 shows a schematic diagram illustrating content of the first embodiment of a link measurement information unit in an extended measurement result message according to the disclosure.
FIG. 7 shows a block diagram illustrating principle of the first embodiment of a system according to the disclosure.

FIG. 6 shows a schematic diagram illustrating content of the first embodiment of a link measurement information unit in an extended measurement result message according to the disclosure, wherein Element identifier field indicates the identifier of this information unit;

Length field indicates the length of this information unit;

Link Quality field indicates the quality of the link;

Time Delay field indicates the value of the time delay;

Link QoS field indicates the QoS value of the link;

Supplementary measurement information indicates supplementary information.

In the local switching mode, the BS encodes the detected quality statistic information of the call link into the link measurement information unit of the extended measurement result message and transmits the extended measurement result message to the BSC.

FIG. 7 shows a block diagram illustrating principle of the first embodiment of a system according to the disclosure, the system comprises a BS and a BSC;

the BS is configured to encode the detected quality statistic information of the call link into the predetermined message and send the message to the BSC via an Abis interface;

the BSC is configured to parse the received predetermined message and report the quality statistic information of the call link obtained by parsing.

Figure 8:
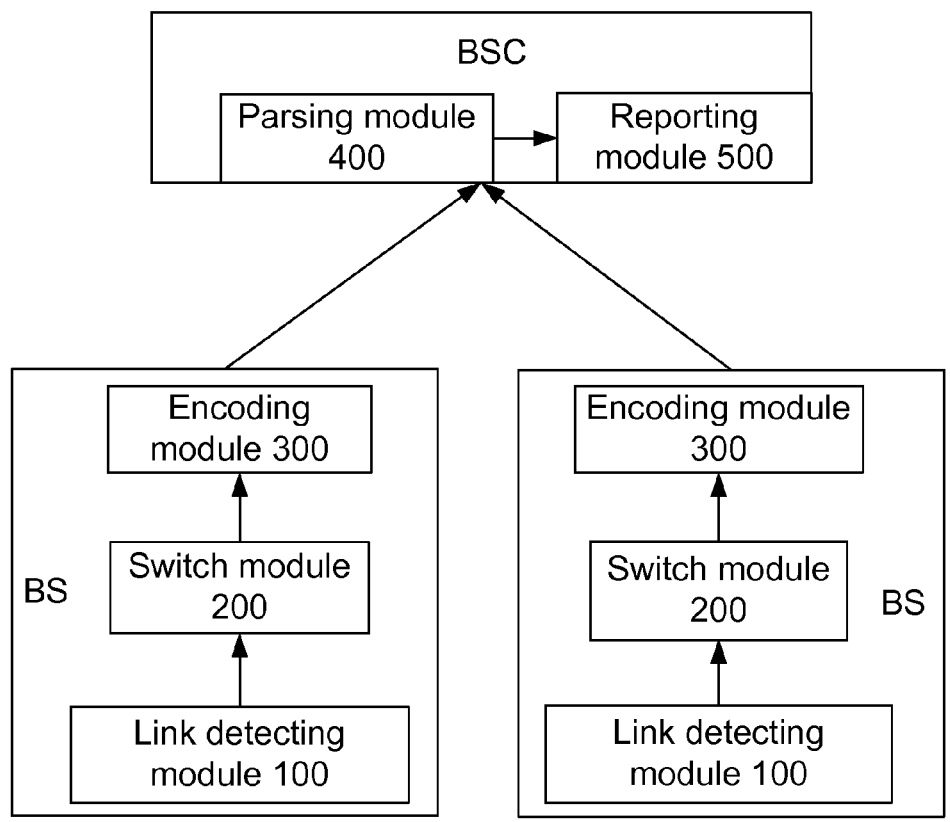
FIG. 8 shows a block diagram illustrating principle of the second embodiment of a system according to the disclosure.

FIG. 8 shows a block diagram illustrating principle of the second embodiment of a system according to the disclosure, the system comprises a BS and a BSC, wherein the BS comprises a link detecting module 100, a switch module 200 and an encoding module 300; the BSC comprises a decoding module 400 and a reporting module 500;

the link detecting module 100 is configured to detect the quality statistic information of the call link and send the quality statistic information of the call link to the switch module 200;

the switch module 200 is configured to send the quality statistic information of the call link to the encoding module 300 when the switching mode identifier is the local switching, or configured to send the quality statistic information of the call link to the reporting module 500 through an RTCP link when the switching mode identifier is the conventional switching;

the encoding module 300 is configured to encode the received quality statistic information of the call link into the extended measurement result message and send the extended measurement result message to the decoding module 400 of the BSC;

the decoding module 400 is configured to parse the received extended measurement result message and send the quality statistic information of the call link obtained by parsing to the reporting module 500;

the reporting module 500 is configured to report the received quality statistic information of the call link.

Figure 9:
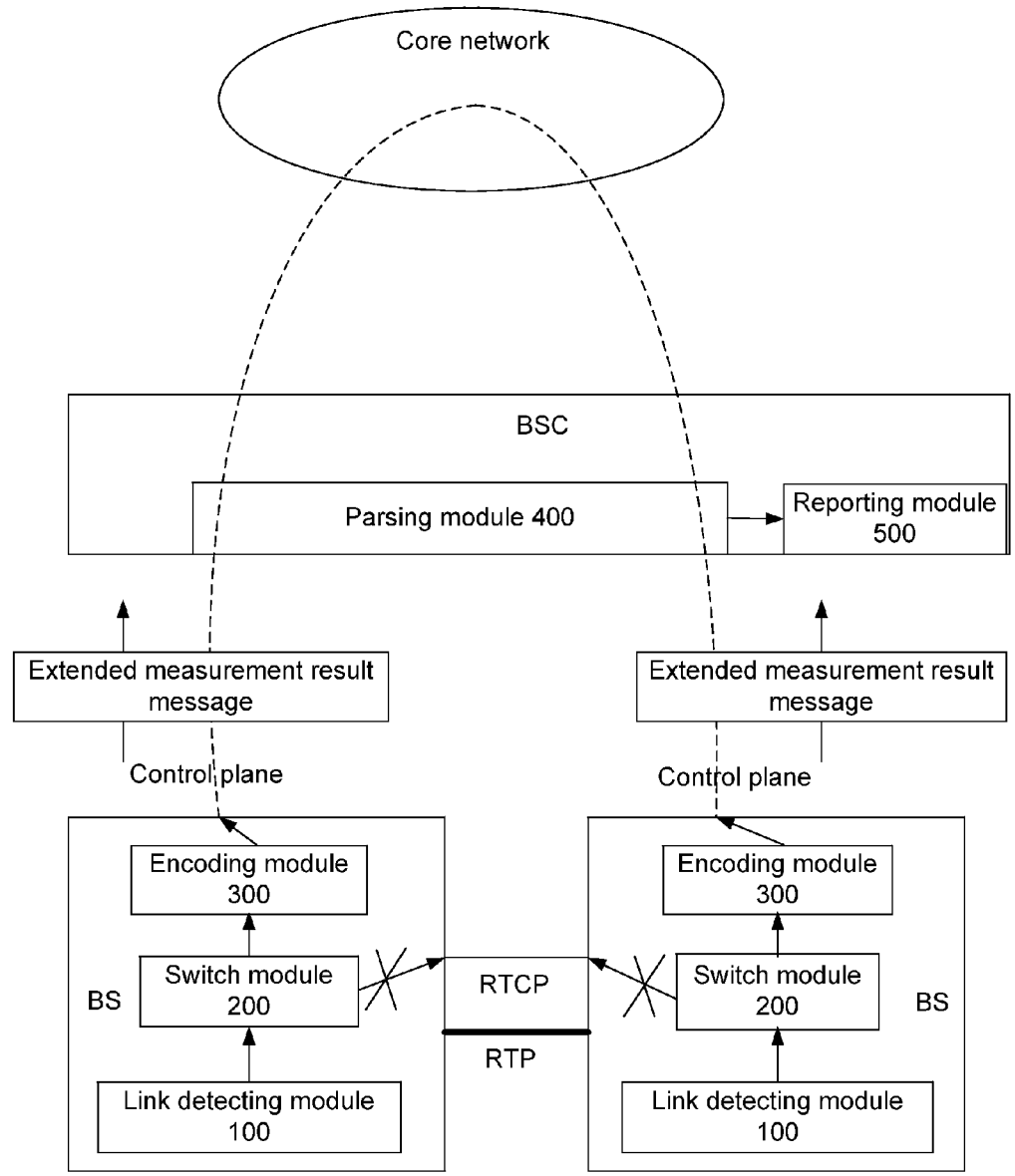
FIG. 9 shows a flowchart illustrating a trend of quality statistic information of a call link after the system as shown in FIG. 8 switches to a local switching mode from a conventional switching mode.

FIG. 9 shows a flowchart illustrating a trend of quality statistic information of a call link after the system as shown in FIG. 8 switches to a local switching mode from the conventional switching mode; as shown in FIG. 9, in the embodiment, the quality statistic information of the call link is reported to the BSC through the extended measurement result message.

Figure 10:
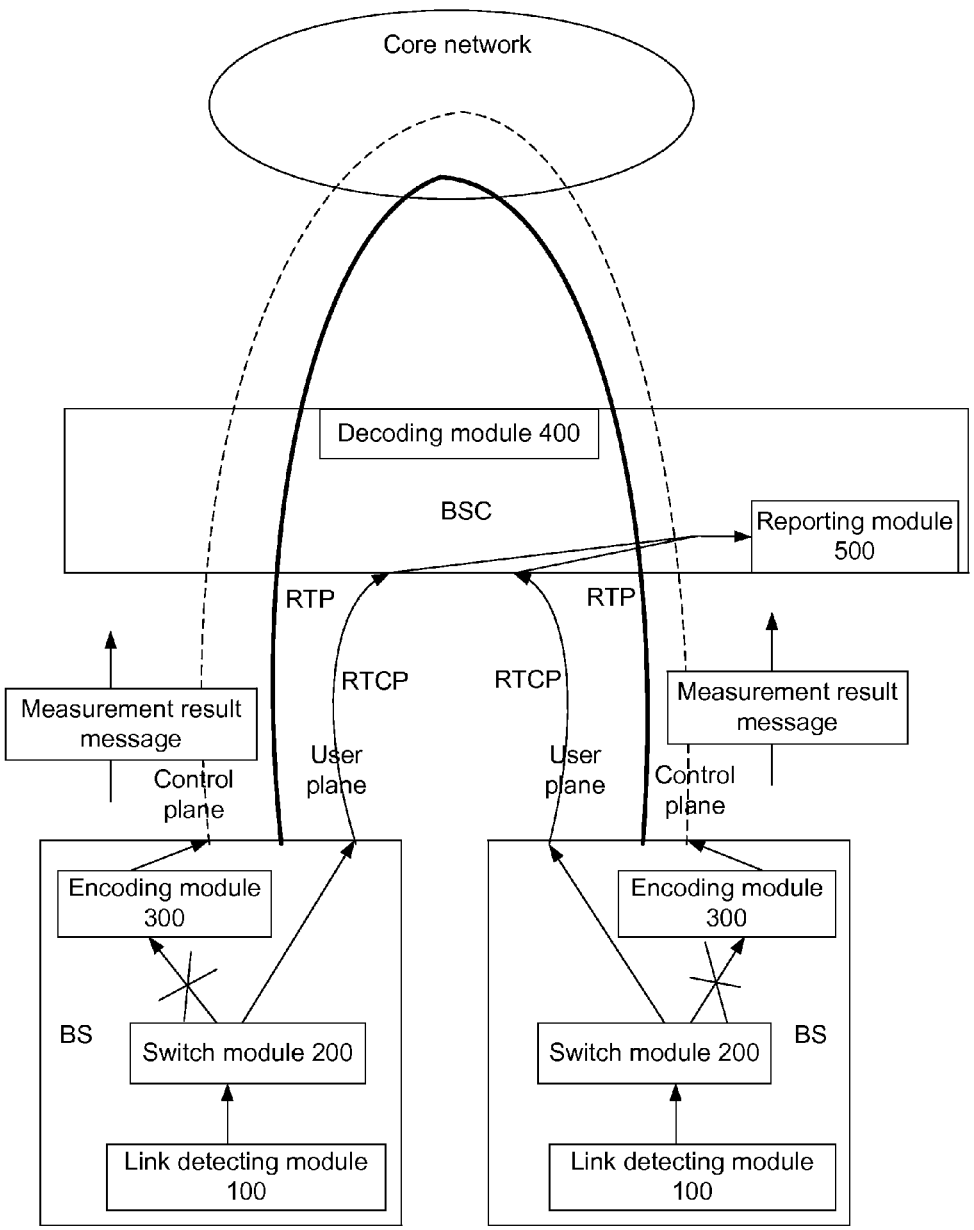
FIG. 10 shows a flowchart illustrating a trend of quality statistic information of a call link after the system as shown in FIG. 8 switches to a conventional switching mode from a local switching mode.

FIG. 10 shows a flowchart illustrating a trend of quality statistic information of a call link after the system as shown in FIG. 8 switches to a conventional switching mode from a local switching mode; as shown in FIG. 10, in the embodiment, the quality statistic information of the call link is reported to the BSC through the RTCP link.

The disclosure is applicable to the Personal Handy Phone System (PHS), Code Division Multiple Access (CDMA), 3rd-Generation (3G) and other mobile communication systems.

The above is only the preferred embodiment of the disclosure and is not intended to limit the patent scope of the disclosure. Any equivalent structures or equivalent flow modifications made according to the description and the accompanying drawings of the disclosure, or any equivalent structures or equivalent flow modifications applied in other relevant technical fields directly or indirectly shall be included in the patent protection scope of the disclosure.

The invention claimed is:

1. A method for reporting quality statistic information of a call link, comprising:

predetermining an extended measurement result message for transmitting the quality statistic information of the call link between a Base Station (BS) and a Base Station Controller (BSC);

encoding, by the BS, detected quality statistic information of the call link of a current call into a link measurement information unit of the extended measurement result message when detecting that the current call enters into a local switching mode by the BS;

reporting, by the BS, the detected quality statistic information of the call link of the current call to the BSC through the extended measurement result message;

parsing, by the BSC, the received extended measurement result message, and reporting the quality statistic information of the call link of the current call obtained by parsing.

2. The method according to claim 1, wherein the link measurement information unit comprises a link quality field, a time delay field, a link Quality of Service (QoS) field.

3. A system for reporting quality statistic information of a call link, comprising a Base Station (BS) and a Base Station Controller (BSC); wherein predetermine an extended measurement result message for transmitting the quality statistic information of the call link between the BS and the BSC;

the BS is configured to encode detected quality statistic information of the call link of a current call into a link measurement information unit of the extended measurement result message when the BS detects that the current call enters into a local switching mode and send the detected quality statistic information of the call link of the current call to the BSC through the extended measurement result message;

the BSC is configured to parse the received extended measurement result message and report the quality statistic information of the call link of the current call obtained by parsing.

4. The system according to claim 3, wherein the BS comprises a link detecting module, a switch module and an encoding module, wherein the link detecting module is configured to detect that the current call enters into the local switching mode, and detect the quality statistic information of the call link of the current call;

the switch module is configured to send the quality statistic information of the call link of the current call detected by the link detecting module to the encoding module;

the encoding module is configured to encode the received quality statistic information of the call link of the current call into the link measurement information unit of the extended measurement result message when the current call enters into the local switching mode and send the detected quality statistic information of the call link of the current call to the BSC through the extended measurement result message.

5. The system according to claim 4, wherein the BSC comprises a decoding module and a reporting module, wherein the decoding module is configured to parse the received extended measurement result message and send the quality statistic information of the call link of the current call obtained by parsing to the reporting module;

the reporting module is configured to report the received quality statistic information of the call link of the current call.

6. The system according to claim 5, wherein the BS is further configured to send the detected quality statistic information of the call link to the BSC; the switch module is further configured to send the quality statistic information of the call link detected by the link detecting module to the reporting module through a Realtime Transport Control Protocol (RTCP) link.

7. The system according to claim 3, wherein the BSC comprises a decoding module and a reporting module, wherein the decoding module is configured to parse the received extended measurement result message and send the quality statistic information of the call link of the current call obtained by parsing to the reporting module;

the reporting module is configured to report the received quality statistic information of the call link of the current call.

8. The system according to claim 7, wherein the BS is further configured to send the detected quality statistic information of the call link to the BSC; the switch module is further configured to send the quality statistic information of the call link detected by the link detecting module to the reporting module through a Realtime Transport Control Protocol (RTCP) link.

9. A Base Station (BS), configured to encode detected quality statistic information of a call link of a current call into a link measurement information unit of an extended measurement result message when the BS detects that the current call enters into a local switching mode and send the detected quality statistic information of the call link of the current call through the extended measurement result message.

\* \* \* \* \*